US012309802B2

(12) United States Patent
Chen et al.

(10) Patent No.: US 12,309,802 B2
(45) Date of Patent: May 20, 2025

(54) DEVICE AND METHOD FOR HANDLING A HYBRID AUTOMATIC REPEAT REQUEST TRANSMISSION

(71) Applicant: ACER INCORPORATED, New Taipei (TW)

(72) Inventors: Jen-Hsien Chen, New Taipei (TW); Chien-Min Lee, New Taipei (TW); Li-Chung Lo, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 410 days.

(21) Appl. No.: 17/870,795

(22) Filed: Jul. 21, 2022

(65) Prior Publication Data

US 2023/0042313 A1 Feb. 9, 2023

Related U.S. Application Data

(60) Provisional application No. 63/229,575, filed on Aug. 5, 2021.

(51) Int. Cl.
*H04W 72/23* (2023.01)
*H04L 1/1812* (2023.01)

(52) U.S. Cl.
CPC ........... *H04W 72/23* (2023.01); *H04L 1/1812* (2013.01)

(58) Field of Classification Search
None
See application file for complete search history.

(56) References Cited

U.S. PATENT DOCUMENTS

| 12,114,264 B2* | 10/2024 | Guo | ................. H04W 52/0229 |
| 2018/0062796 A1 | 3/2018 | Feng | |
| 2019/0312713 A1 | 10/2019 | Yang | |

(Continued)

FOREIGN PATENT DOCUMENTS

| EP | 3 780 839 A1 | 2/2021 |
| JP | 2018-508145 | 3/2018 |

(Continued)

OTHER PUBLICATIONS

Moderator (LG Electronics), Summary #1 of PDSCH/PUSCH enhancements (Scheduling/HARQ). 3GPP TSG RAN WG1 #104b-e R1-2103344, e-Meeting, Apr. 12-20, 2021, p. 1-38, XP051995626.

(Continued)

*Primary Examiner* — Xavier S Wong
(74) *Attorney, Agent, or Firm* — Winston Hsu

(57) ABSTRACT

A communication device for handling a hybrid automatic repeat request (HARQ) transmission, comprises at least one storage device; and at least one processing circuit, coupled to the at least one storage device, wherein the at least one storage device stores instructions, and the at least one processing circuit is configured to execute the instructions of: receiving a configuration from a network, wherein the configuration comprises a time domain resource allocation (TDRA) table and a set of a plurality of timing values; and receiving a downlink (DL) control information (DCI) from the network, wherein the DCI indicates a row of the TDRA table for at least one physical DL shared channel (PDSCH) reception and indicates a timing value of the set of the plurality of timing values for the HARQ transmission corresponding to the at least one PDSCH reception.

10 Claims, 13 Drawing Sheets

(56) References Cited

U.S. PATENT DOCUMENTS

| | | |
|---|---|---|
| 2021/0006313 A1 | 1/2021 | Rune |
| 2021/0153185 A1 | 5/2021 | Schober |
| 2021/0160829 A1 | 5/2021 | Park |
| 2021/0321446 A1* | 10/2021 | Lee .................... H04W 72/535 |
| 2022/0159692 A1 | 5/2022 | Lee |
| 2022/0322404 A1* | 10/2022 | Kwak ............... H04W 72/1263 |
| 2023/0006798 A1 | 1/2023 | Lee |
| 2023/0198683 A1* | 6/2023 | Gao .................. H04W 72/1273 |
| | | 370/280 |
| 2023/0209530 A1* | 6/2023 | Rastegardoost ...... H04L 1/1854 |
| | | 370/329 |
| 2023/0246788 A1* | 8/2023 | Jiang .................... H04L 5/0094 |
| | | 370/329 |

FOREIGN PATENT DOCUMENTS

| | | |
|---|---|---|
| WO | 2020/197195 A1 | 10/2020 |
| WO | 2020/204526 A1 | 10/2020 |
| WO | 2020/204800 A1 | 10/2020 |
| WO | 2020/255270 A1 | 12/2020 |
| WO | 2021/033116 A1 | 2/2021 |
| WO | 2021/100982 A1 | 5/2021 |

OTHER PUBLICATIONS

LG Electronics, PDSCH/PUSCH enhancements to support NR above 52.6 GHz, 3GPP TSG RAN WG1 #104b-e R1-2103343, e-Meeting, Apr. 12-20, 2021.

Toru Oizumi et al., Improvement of the Worst ACK/NACK Bit Error Performance for LTE-Advanced Channel Selection, IEICE Technical Report RCS2011-141(Oct. 2011), The Institute of Electronics, Information and Communication Engineers, Oct. 2011, pp. 7-12, Oct. 2011.

3GPP TS 38.214, "3rd Generation Partnership Project; Technical Specification Group Radio Access Networkc NR; Physical layer procedures for data (Release 15)", V15.6.0, Jun. 2019.

* cited by examiner

| Row indexes | Entry |
|---|---|
| 00 | R(0,0)={SLIV_0={0,6}, K0_0=1, MT_0=A}<br>R(0,1)={SLIV_1={0,6}, K0_1=2, MT_1=A} |
| 01 | R(1,0)={SLIV_2={6,7}, K0_2=1, MT_2=A}<br>R(1,1)={SLIV_3={3,6}, K0_3=2, MT_3=A} |
| 10 | R(2,0)={SLIV_4={3,3}, K0_4=2, MT_4=A} |
| 11 | R(3,0)={SLIV_5={5,2}, K0_5=2, MT_5=A} |

FIG. 4

DEVICE AND METHOD FOR HANDLING A HYBRID AUTOMATIC REPEAT REQUEST TRANSMISSION

CROSS REFERENCE TO RELATED APPLICATIONS

This application claims the benefit of U.S. Provisional Application No. 63/229,575, filed on Aug. 5, 2021. The content of the application is incorporated herein by reference.

BACKGROUND OF THE INVENTION

1. Field of the Invention

The present invention relates to a device and a method used in a wireless communication system, and more particularly, to a device and a method of handling a hybrid automatic repeat request transmission.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes at least one evolved Node-B (eNB) for communicating with at least one user equipment (UE), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, increases peak data rate and throughput, and includes advanced techniques, such as carrier aggregation (CA), coordinated multipoint (CoMP) transmissions/reception, uplink (UL) multiple-input multiple-output (UL-MIMO), licensed-assisted access (LAA) (e.g., using LTE), etc. For a UE and an eNB to communicate with each other in the LTE-A system, the UE and the eNB must support standards developed for the LTE-A system, such as the 3GPP Rel-1X standard or later versions.

A next generation radio access network (NG-RAN) is developed for further enhancing the LTE-A system. The NG-RAN includes one or more next generation Node-Bs (gNBs), and has properties of wider operation bands, different numerologies for different frequency ranges, massive MIMO, advanced channel codings, etc.

According to the 3GPP standard, the UE may be scheduled multiple physical downlink (DL) shared channels (PDSCHs) by a DL control information (DCI). Then, the UE may determine multiple information bits of the multiple PDSCHs in a slot according to the DCI and may perform hybrid automatic repeat request (HARQ) transmission according to the multiple information bits. However, there may be redundant bits in the multiple information bits, which may degrade a performance of the HARQ transmission. Thus, it is important to reduce the redundant bits when performing the HARQ transmission.

SUMMARY OF THE INVENTION

The present invention therefore provides a device and a method for handling a hybrid automatic repeat request transmission to solve the abovementioned problem.

A communication device for handling a hybrid automatic repeat request (HARQ) transmission, comprises at least one storage device; and at least one processing circuit, coupled to the at least one storage device, wherein the at least one storage device stores instructions, and the at least one processing circuit is configured to execute the instructions of: receiving a configuration from a network, wherein the configuration comprises a time domain resource allocation (TDRA) table and a set of a plurality of timing values; and receiving a downlink (DL) control information (DCI) from the network, wherein the DCI indicates a row of the TDRA table for at least one physical DL shared channel (PDSCH) reception and indicates a timing value of the set of the plurality of timing values for the HARQ transmission corresponding to the at least one PDSCH reception.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is a schematic diagram of a TDRA Table according to an example of the present invention.

DETAILED DESCRIPTION

Figure 1:
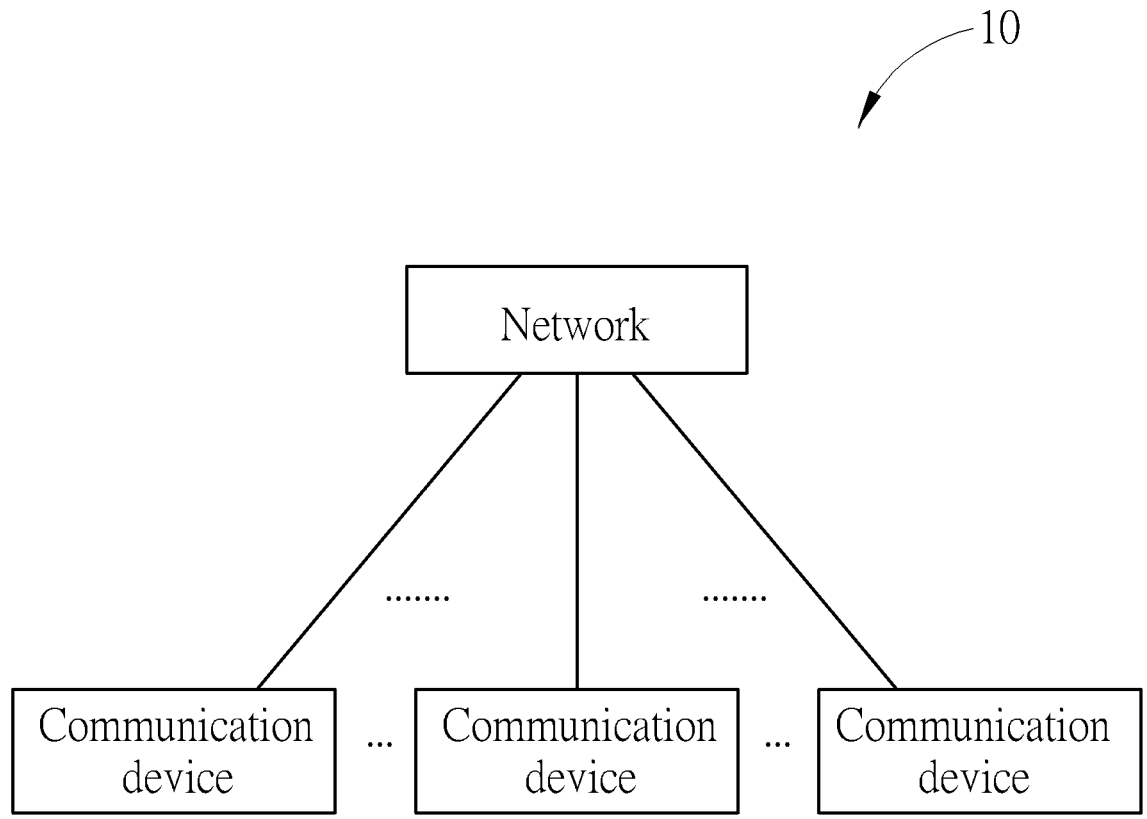
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The wireless communication system 10 may support a time-division duplexing (TDD) mode, a frequency-division duplexing (FDD) mode, a TDD-FDD joint operation mode or a licensed-assisted access (LAA) mode. That is, the network and a communication device may communicate with each other via FDD carrier(s), TDD carrier(s), licensed carrier(s) (licensed serving cell (s)) and/or unlicensed carrier (s) (unlicensed serving cell(s)). In addition, the wireless communication system 10 may support a carrier aggregation (CA). That is, the network and a communication device may communicate with each other via multiple serving cells (e.g., multiple serving carriers) including a primary cell (e.g., primary component carrier) and one or more secondary cells (e.g., secondary component carriers).

In FIG. 1, the network and the communication devices are simply utilized for illustrating the structure of the wireless communication system 10. Practically, the network may be a universal terrestrial radio access network (UTRAN) including at least one Node-B (NB) in a universal mobile telecommunications system (UMTS). In one example, the network may be an evolved UTRAN (E-UTRAN) including at least one evolved NB (eNB) and/or at least one relay node in a long term evolution (LTE) system, a LTE-Advanced (LTE-A) system, an evolution of the LTE-A system, etc. In one example, the network may be a next generation radio access network (NG-RAN) including at least one next generation Node-B (gNB) and/or at least one fifth generation (5G) base station (BS). In one example, the network may be any BS conforming to a specific communication standard to communicate with a communication device.

A NR is a standard defined for a 5G system (or 5G network) to provide a unified air interface with better performance. gNBs are deployed to realize the 5G system, which supports advanced features such as enhanced Mobile Broadband (eMBB), Ultra Reliable Low Latency Communications (URLLC), massive Machine Type Communications (mMTC), etc. The eMBB provides broadband services with a greater bandwidth and a low/moderate latency. The URLLC provides applications (e.g., end-to-end communication) with properties of a higher security and a low latency. The examples of the applications include an industrial internet, smart grids, infrastructure protection, remote surgery and an intelligent transportation system (ITS). The mMTC is able to support internet-of-things (IoT) of the 5G system which include billions of connected devices and/or sensors.

Furthermore, the network may also include at least one of the UTRAN/E-UTRAN/NG-RAN and a core network, wherein the core network may include network entities such as Mobility Management Entity (MME), Serving Gateway (S-GW), Packet Data Network (PDN) Gateway (P-GW), Self-Organizing Networks (SON) server and/or Radio Network Controller (RNC), etc. In one example, after the network receives information transmitted by a communication device, the information may be processed only by the UTRAN/E-UTRAN/NG-RAN and decisions corresponding to the information are made at the UTRAN/E-UTRAN/NG-RAN. In one example, the UTRAN/E-UTRAN/NG-RAN may forward the information to the core network, and the decisions corresponding to the information are made at the core network after the core network processes the information. In one example, the information may be processed by both the UTRAN/E-UTRAN/NG-RAN and the core network, and the decisions are made after coordination and/or cooperation are performed by the UTRAN/E-UTRAN/NG-RAN and the core network.

A communication device may be a user equipment (UE), a low cost device (e.g., machine type communication (MTC) device), a device-to-device (D2D) communication device, a narrow-band internet of things (IoT) (NB-IoT), a mobile phone, a laptop, a tablet computer, an electronic book, a portable computer system, or combination thereof. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
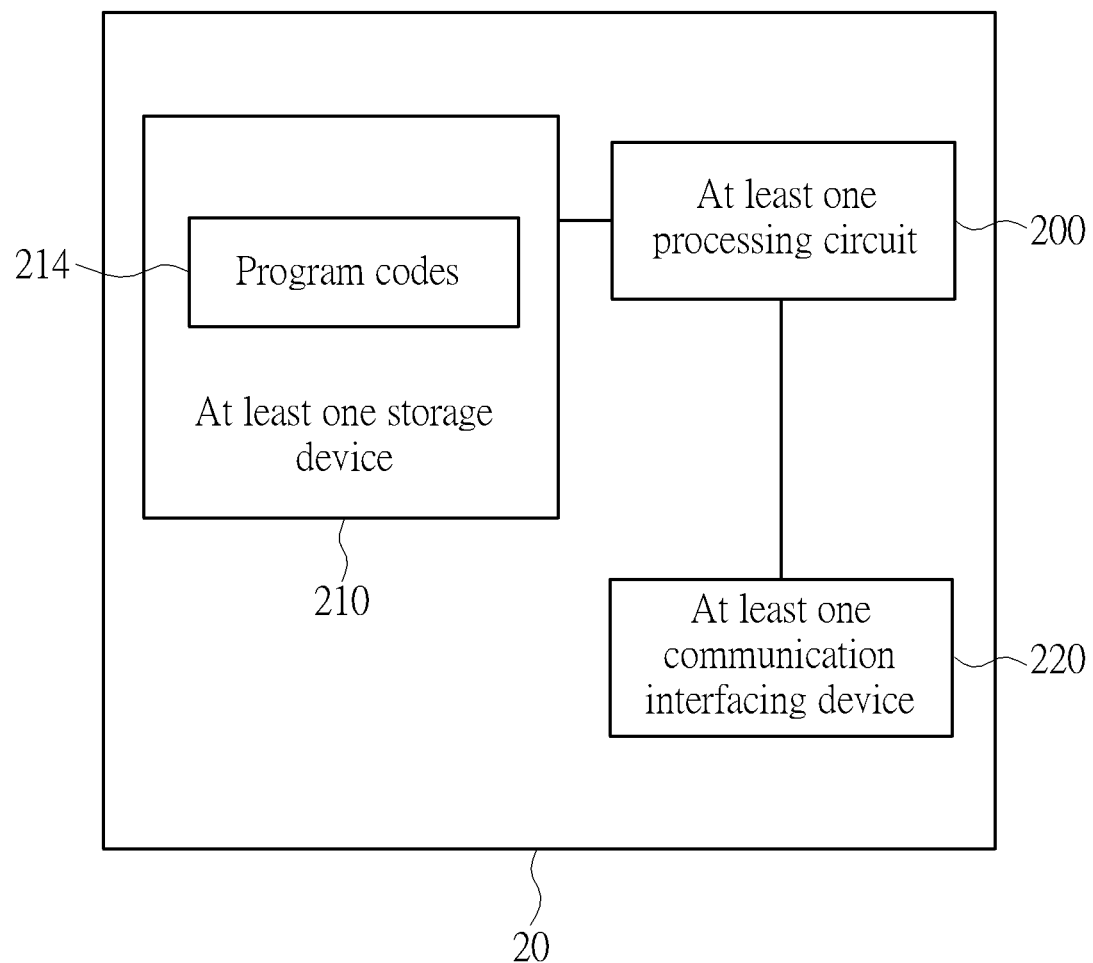
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

Figure 3:
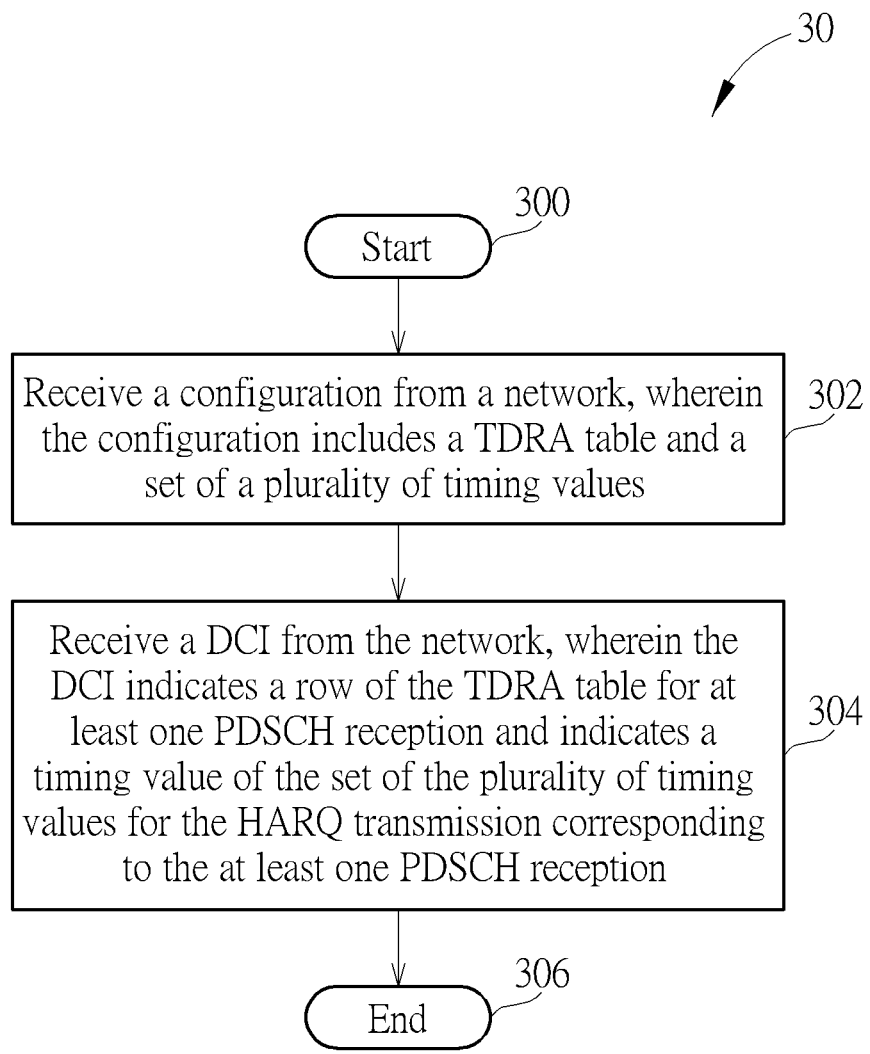
FIG. 3 is a flowchart of a process according to an example of the present invention.

FIG. 3 is a flowchart of a process 30 according to an example of the present invention. The process 30 may be utilized in a communication device (e.g., the communication device in FIG. 1), to handle a HARQ transmission. The process 30 may be compiled into the program codes 214 and includes the following steps:

Step 300: Start.

Step 302: Receive a configuration from a network (e.g., the network in FIG. 1), wherein the configuration comprises a time domain resource allocation (TDRA) table and a set of a plurality of timing values.

Step 304: Receive a DL control information (DCI) from the network, wherein the DCI indicates a row of the TDRA table for at least one physical DL shared channel (PDSCH) reception and indicates a timing value of the set of the plurality of timing values for the HARQ transmission corresponding to the at least one PDSCH reception.

Step 306: End.

According to the process 30, the communication device may receive a configuration from a network, wherein the configuration includes a TDRA table and a set of a plurality of timing values. Then, the communication device may receive a DCI from the network, wherein the DCI indicates a row of the TDRA table for at least one PDSCH reception and indicates a timing value of the set of the plurality of timing values for the HARQ transmission corresponding to the at least one PDSCH reception. That is, the at least one PDSCH reception is jointly considered by the communication device when the communication device determines at least one information bit of the at least one PDSCH reception according to the DCI. Accordingly, the communication device may determine an information bit of the at least one PDSCH reception according to the DCI, and the communication device may perform the HARQ transmission according to the information bit. Thus, the problem of the redundant bits in the prior art can be improved.

Realization of the process 30 is not limited to the above description. The following examples may be applied for realizing the process 30.

In one example, the TDRA table may include at least one row. In one example, each row of the TDRA table may include at least one entry, e.g., for the communication device to perform the at least one PDSCH reception scheduled by a DCI. In one example, each of the at least one entry may have (e.g., include) a (e.g., separate) start and length indicator value (SLIV), (e.g., a separate) mapping type and (e.g., a separate) scheduling offset, for the communication device to perform one PDSCH reception of the at least one PDSCH reception. The at least one PDSCH reception may or may not in a single slot. The SLIV may include a start orthogonal frequency-division multiplexing (OFDM) symbol index of the one PDSCH reception of the at least one PDSCH reception, and may include a length of the one PDSCH reception of the at least one PDSCH reception. The mapping type may include a type "A" or a type "B" for the one PDSCH reception of the at least one PDSCH reception. The scheduling offset may indicate the number of slots after a slot that the communication device receives the DCI for the communication device to perform the one PDSCH reception of the at least one PDSCH reception. For example, the communication device receives a PDSCH in a slot (n+1) after a slot(n) for receiving a DCI for scheduling the PDSCH, when the scheduling offset indicates "1". For another example, the communication device receives a PDSCH in a slot(n+2) after a slot(n) for receiving a DCI for scheduling the PDSCH, when the scheduling offset indicates "2". The above n is a non-negative integer.

In the present invention, the communication device receives a PDSCH means that the communication device perform a PDSCH reception.

In one example, the at least one PDSCH reception may not overlap with a UL symbol (e.g., resource). That is, the communication device does not determine the HARQ transmission of a PDSCH reception (e.g., of the at least one PDSCH), when the PDSCH reception collides (e.g., overlaps) with the UL symbol on a time resource. In other words, the PDSCH reception used for determining the HARQ transmission may not collide (e.g., overlap) with the UL symbol. In short, any PDSCH reception colliding (e.g., overlapping) with the UL symbol may not be used for determining the HARQ transmission. In one example, the communication device may be configured with the UL symbol by the network.

In one example, the communication device may determine the number of information bits of a plurality of PDSCHs scheduled by DCIs for the slot according to the DCIs, which may include: determining the number of the information bits of the plurality of PDSCHs scheduled by the DCIs for the slot according to a maximum value of a plurality of number of information bits of a plurality of groups. In one example, each of the groups may be determined according to a set of the DCIs scheduling the plurality of PDSCHs in the slot. In one example, the PDSCHs may not overlap. In one example, the number of information bits of the each of the groups may be determined (e.g., calculated) according to the number of the PDSCHs. For example, the number of information bits of the each of the groups is determined as 3, when the number of the PDSCHs is 3.

In one example, the HARQ transmission may be performed by transmitting an "ACK" or a "NACK". In one example, the communication device may determine a first plurality of occasions of the HARQ transmission for the slot according to a plurality of reference indexes of the PDSCHs, and may determine a plurality of locations of the HARQ transmission for the slot according to the first occasions. The reference indexes may be associated with (e.g., mapped to) the first occasions. In one example, the reference indexes may be determined according to a plurality of the last OFDM symbol indexes of the PDSCHs, respectively. For example, one of the last OFDM symbol indexes of the PDSCHs is m, and one (e.g., corresponding one) of the reference indexes is m+(n*14), where m is a non-negative integer, and n is 0 and/or 1.

In one example, information of the reference indexes may be configured by the network according to a capability of the communication device, e.g., via a radio resource control (RRC) message, a DCI (e.g., any of the above DCIs or a dedicate DCI) or a media access control control element (MAC CE). The capability of the communication device may be transmitted from the communication device to the network, to inform the network that the number of PDSCHs can be received by the communication device via the slot. In one example, the communication device may determine the reference indexes according to the information of the reference indexes. In one example, the information may be a distributed factor, where the distributed factor is a positive integer. For example, the communication device may determine the reference indexes as OFDM symbol indexes every 3 OFDM symbols starting from the starting OFDM symbol index (e.g., 0). For example, the reference indexes is determined as {2, 5, 8, 11}, when the distributed factor indicates 3. In one example, the information may be an index vector, where the index vector includes positive integers. For example, the communication device may determine the reference indexes as {2, 6, 10}, when the index vector indicates {2, 6, 10}.

In one example, the communication device may perform a plurality of physical UL control channels (PUCCHs) according to the set of timing values. For example, the communication device may perform a PUCCH in a slot(n+1) or a slot(n+2) after a slot(n) for receiving the PDSCH, when a timing value indicates "1" or "2".

In one example, the timing value of the set of the plurality of timing values may be applied to (e.g., used for) a slot for the last PDSCH reception of the at least one PDSCH reception scheduled by the DCI. In other words, the slot in which the last PDSCH reception of the at least one PDSCH reception scheduled by the DCI locates. For example, the communication device may perform a HARQ transmission in a slot(n+2) including a PUCCH resource after a slot(n+1) for the last PDSCH reception of the at least one PDSCH reception scheduled by the DCI, when a timing value indicates "1". For another example, the communication device may perform a HARQ transmission in a slot(n+2) including a PUCCH resource after a slot(n) for the last PDSCH reception of the at least one PDSCH reception scheduled by the DCI, when a timing value indicates "2".

FIG. 4 is a schematic diagram of a TDRA Table 40 according to an example of the present invention. The TDRA Table 40 may be used for realizing the TDRA Table in FIG. 3. 4 rows lists labeled by row indexes {00, 01, 10, 11} for scheduling PDSCHs are considered in the present example. For example, the row index {00} indicates 2 entries, e.g., R(0,0) and R(0, 1) for scheduling 2 PDSCHs, respectively. R(0,0) includes a SLIV SLIV_0 indicating "{0,6}", a scheduling offset K0_0 indicating "1" and a mapping type MT_0 indicating "A", for the communication device to receive a first PDSCH. R(0,1) includes the SLIV SLIV_1 indicating "{0,6}", the scheduling offset K0_1 indicating "2" and the mapping type MT_1 indicating "A", for the communication device to receive a second PDSCH. For example, the row index {01} indicates 2 entries, e.g., R(1,0) and R(1,1), for scheduling 2 PDSCHs, respectively. R(1,0) includes the SLIV SLIV_2 indicating "{6,7}", the scheduling offset K0_2 indicating "1" and the mapping type MT_2 indicating "A", for the communication device to receive a third PDSCH. R(1,1) includes the SLIV SLIV_3 indicating "{0,6}", the scheduling offset K0_3 indicating "2" and the mapping type MT_3 indicating "A", for the communication device to receive a fourth PDSCH. For example, the row index {10} indicates 1 entry, e.g., R(2,0), for scheduling 1 PDSCH. R(1,0) includes the SLIV SLIV_4 indicating "{0,3}", the scheduling offset K0_4 indicating "2" and the mapping type MT_4 indicating "A", for the communication device to receive a fifth PDSCH. For example, the row index {11} indicates 1 entry, e.g., R(3,0), for scheduling 1 PDSCH. R(3,0) includes the SLIV SLIV_5 indicating "{5,2}", the scheduling offset K0_5 indicating "2" and the mapping type MT_5 indicating "A", for the communication device to receive a sixth PDSCH.

In one example, the communication device may receive the TDRA table 40 and the set of timing values in a configuration from the network, and receives a DCI indicating that the row index {00} is used for scheduling PDSCHs in a slot(n−1). Then, the communication device may perform receptions of the PDSCHs in a slot(n), when (e.g., since) the scheduling offsets K0_0 and K0_1 indicate "1".

Figure 5:
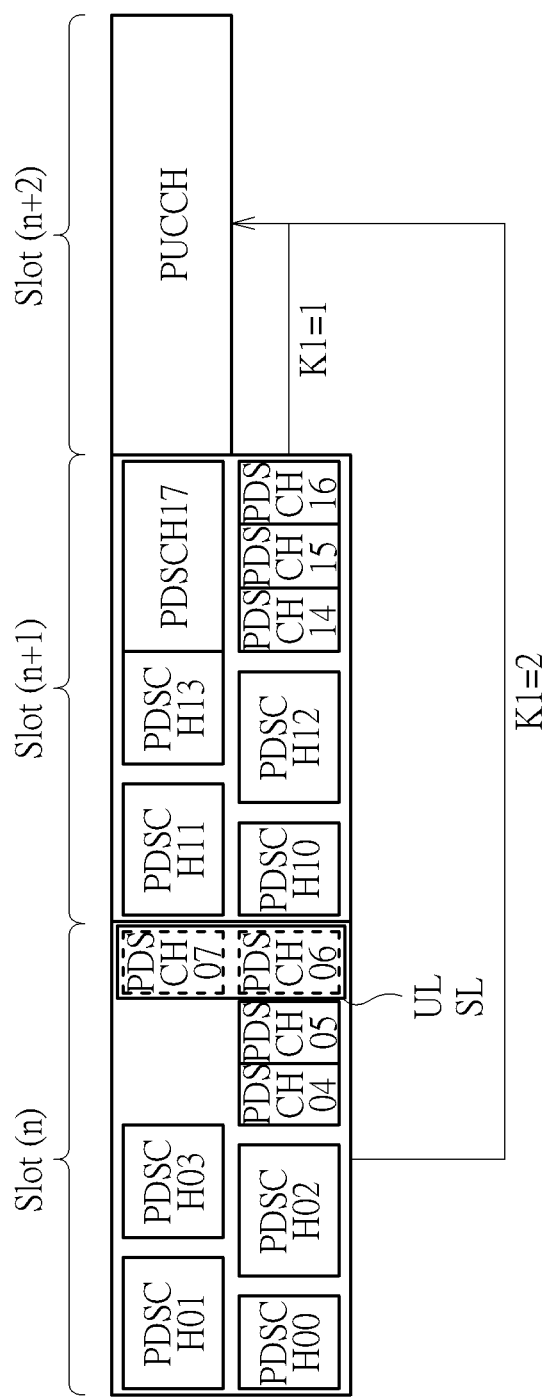
FIG. 5 is a schematic diagram of determining HARQ transmission for 2 slots according to an example of the present invention.

FIG. 5 is a schematic diagram of determining HARQ transmission for 2 slots according to an example of the present invention. There are candidate PDSCHs PDSCH00-PDSCH07 and candidate PDSCHs PDSCH10-PDSCH17 in the present example. Receptions of the candidate PDSCHs PDSCH00-PDSCH07 may be performed in the slot (n) and receptions of the candidate PDSCHs PDSCH10-PDSCH17 may be performed in the slot(n+1), where n is a non-negative integer. In the slot(n+1), the candidate PDSCHs PDSCH10-PDSCH17 does not overlap with a UL symbol, and the communication device determines the information bit(s) of the candidate PDSCHs PDSCH10-PDSCH17. In the slot (n), a time resource for the candidate PDSCHs PDSCH06-PDSCH07 and a time resource for a UL symbol ULSL (e.g., UL transmission) are overlapped, and the communication device determines the information bit(s) of the candidate PDSCHs PDSCH00-PDSCH05 but does not determine the information bit(s) of the candidate PDSCHs PDSCH06-PDSCH07. In addition, there is a timing value K1 indicating "1" for the communication device to perform a HARQ transmission of the candidate PDSCHs PDSCH10-PDSCH17 according to the information bit(s) of the candidate PDSCHs PDSCH10-PDSCH17 on "1" slot (e.g., slot (n+2) including a PUCCH resource) after performing the receptions of the candidates PDSCHs PDSCH10-PDSCH17. There is a timing value K1 indicating "2" for the communication device to perform a HARQ transmission of the candidate PDSCHs PDSCH00-PDSCH05 according to the information bit(s) of the candidate PDSCHs PDSCH00-PDSCH05 on "2" slot (e.g., slot (n+2) including a PUCCH resource) after performing receptions of the candidates PDSCHs PDSCH00-PDSCH05.

Figure 6:
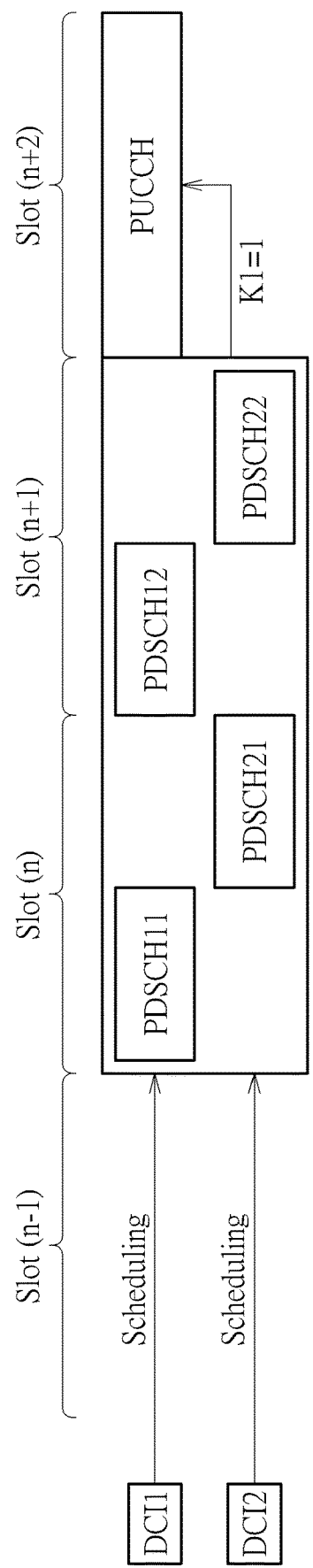
FIG. 6 is a schematic diagram of potential DCIs for a slot according to an example of the present invention.

FIG. 6 is a schematic diagram of potential DCIs for a slot according to an example of the present invention. There is a DCI DCI1 and PDSCHs PDSCH11 and PDSCH12, e.g., a first row of a TDRA table (e.g., the TDRA table in FIG. 4, and is not limited herein), scheduled by the DCI DCI1 and there is a DCI DCI2 and PDSCHs PDSCH21 and PDSCH22, e.g., a second row of the TDRA table, scheduled by the DCI DCI2 in the present example. Receptions of the PDSCHs PDSCH11 and PDSCH21 may be performed in the slot (n) and receptions of the PDSCHs PDSCH12, PDSCH22 may be performed in the slot(n+1), where n is a non-negative integer. The communication device may determine the DCI DCI1 as a first potential DCI for the slot(n), when (e.g., since) the communication device performs the reception of the PDSCH PDSCH11 scheduled by the DCI DCI1 in the slot(n). The communication device may further determine the DCI DCI2 as a second potential DCI for the slot (n), when the communication device performs the reception of the PDSCH PDSCH21 scheduled by the DCI DCI2 in the slot(n). That is, the slot (n) may be determined as a reception slot for the potential DCIs, i.e., the DCIs DCI1 and DCI2.

In addition, there is a timing value K1 indicating "1" for the communication device to perform a HARQ transmission. The timing value K1 indicating "1" is applied to a slot (e.g., the slot (n+1)) for the last PDSCH reception (e.g., the PDSCH PDSCH12) of the at least one PDSCH reception (e.g., the PDSCHs PDSCH11 and PDSCH12) scheduled by a DCI (e.g., the DCI DCI1). In other words, the timing value K1 is applied to the slot in which the last PDSCH reception of the at least one PDSCH reception scheduled by the DCI locates. The communication device may perform the HARQ transmission in a slot (n+2) including a PUCCH resource after the slot (n+1).

Figure 7:
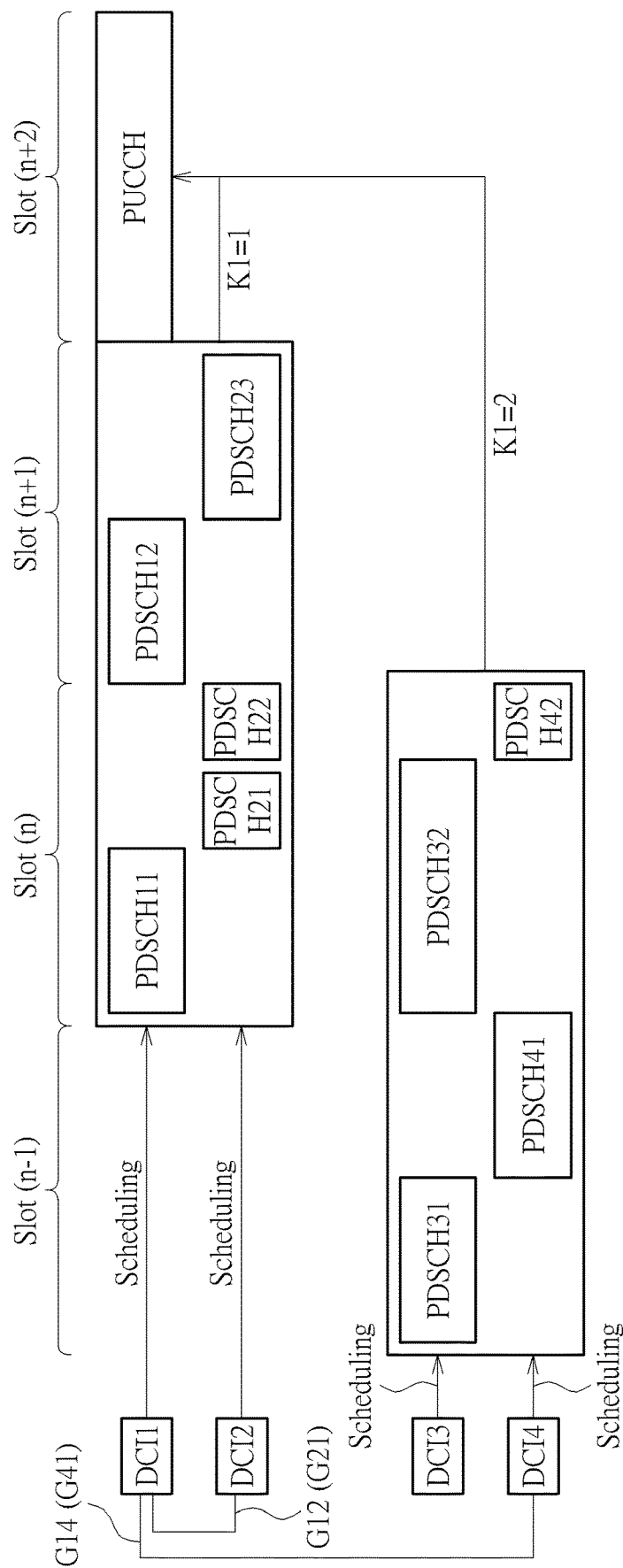
FIG. 7 is a schematic diagram of groups of a potential DCI for a slot according to an example of the present invention.

FIG. 7 is a schematic diagram of the number of information bits for groups of a potential DCI for a slot according to an example of the present invention. There are DCIs DCI1-DCI4 and PDSCHs PDSCH11-PDSCH12, PDSCH21-PDSCH23, PDSCH31-PDSCH32 and PDSCH41-PDSCH42 scheduled by the DCIs DCI1-DCI4 in the present example. Receptions of the PDSCHs PDSCH31 and PDSCH41 may be performed in the slot(n−1), Receptions of the PDSCHs PDSCH11, PDSCH21, PDSCH22, PDSCH32 and PDSCH42 may be performed in the slot(n), and receptions of the PDSCHs PDSCH12 and PDSCH23 may be performed in the slot(n+1), where n is a non-negative integer.

For the slot(n), the communication device may determine the DCI DCI1 as a potential DCI when (e.g., since) the communication device receives the PDSCHs PDSCH11 scheduled by the DCI DCI1 in the slot(n). Similarly, the communication device may determine the DCIs DCI2-DCI4 as potential DCIs. That is, the slot(n) may be determined as a reception slot for the potential DCIs, i.e., the DCIs DCI1-DCI4. Then, the communication device may determine a first group G12 of the DCI DCI1 including the DCIs DCI1 and DCI2 for the slot(n), when (e.g., since) the PDSCHs PDSCH11, PDSCH21 and PDSCH22 in the slot(n) scheduled by the DCIs DCI1 and DCI2 does not overlap. The communication device may determine a second group G14 of the DCI DCI1 including the DCIs DCI1 and DCI4 for the slot(n), when (e.g., since) the PDSCHs PDSCH11 and PDSCH42 in the slot(n) scheduled by the DCIs DCI1 and DCI4 does not overlap.

Similarly, the communication device may determine a third group G21 of the DCI DCI2 including the DCIs DCI1 and DCI2 for the slot(n), when (e.g., since) the PDSCHs PDSCH11, PDSCH21 and PDSCH22 in the slot(n) scheduled by the DCIs DCI1 and DCI2 does not overlap. The communication device may determine a fourth group G34 of the DCI DCI3 including the DCIs DCI3 and DCI4 for the slot(n), when (e.g., since) the PDSCHs PDSCH32 and PDSCH42 in the slot(n) scheduled by the DCIs DCI3 and DCI4 does not overlap. The communication device may determine a fifth group G41 of the DCI DCI4 including the DCIs DCI1 and DCI4 for the slot(n), when (e.g., since) the PDSCHs PDSCH42 and PDSCH11 in the slot (n) scheduled by the DCIs DCI4 and DCI1 does not overlap. The communication device may determine a sixth group G43 of the DCI DCI4 including the DCIs DCI4 and DCI3 for the slot(n), when (e.g., since) the PDSCHs PDSCH42 and PDSCH32 in the slot(n) scheduled by the DCIs DCI4 and DCI3 does not overlap.

In addition, there is a timing value K1 indicating "1" for the communication device to perform a transmission of a first PUCCH of the PDSCHs PDSCH12 and PDSCH23 on "1" slot after performing the receptions of the PDSCHs PDSCH12 and PDSCH23. There is a timing value K1 indicating "2" for the communication device to perform a transmission of a second PUCCH of the PDSCHs PDSCH32 and PDSCH42 on "2" slot after performing receptions of the PDSCH32 and PDSCH42. The timing value K1 indicating "2" is applied to a slot (e.g., the slot (n)) for the last PDSCH reception (e.g., the PDSCH PDSCH32) of the at least one PDSCH reception (e.g., the PDSCHs PDSCH31 and PDSCH32) scheduled by a DCI (e.g., the DCI DCI3). The communication device may perform the HARQ transmission in a slot(n+2) including a PUCCH resource after the slot(n).

Figure 8:
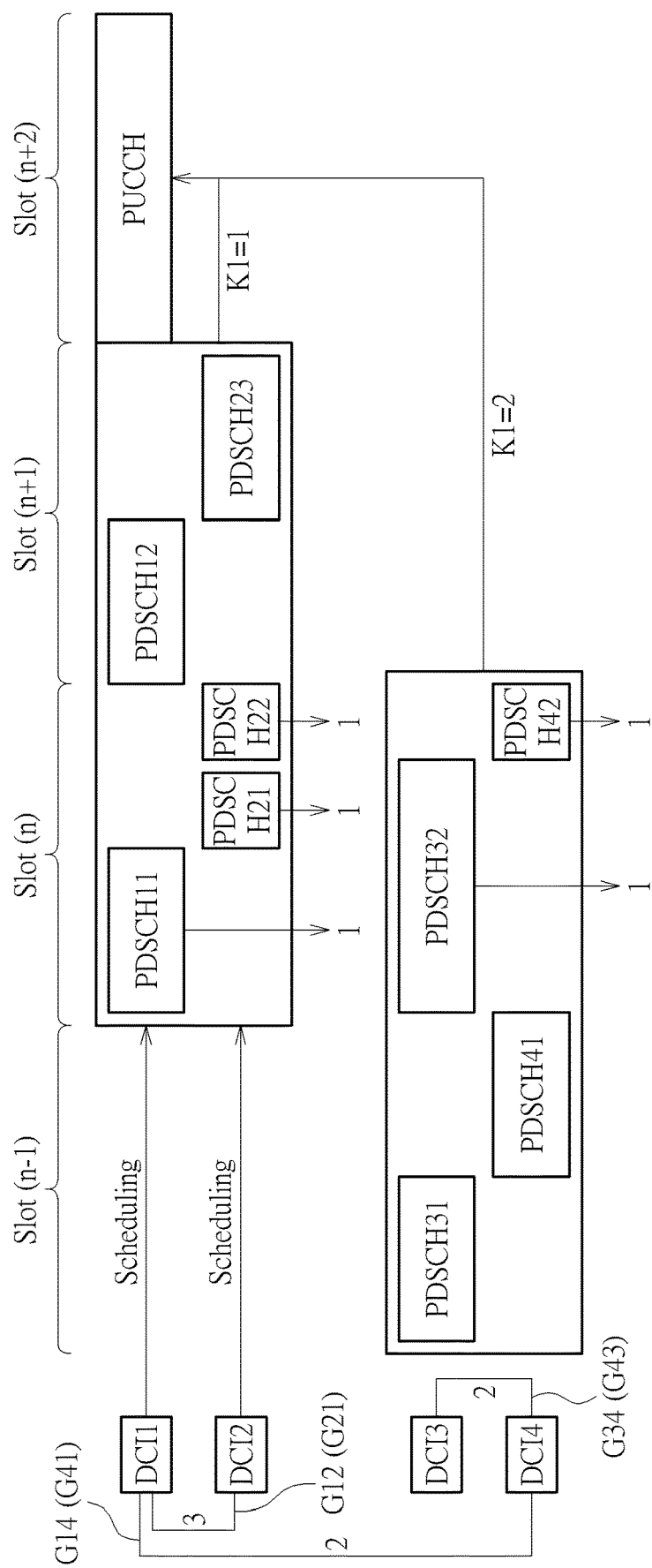
FIG. 8 is a schematic diagram of the number of information bits for groups of a potential DCI for a slot according to an example of the present invention.

FIG. 8 is a schematic diagram of the number of information bits for groups of a potential DCI for a slot according to an example of the present invention. Labels in FIG. 8 can be referred to the labels in FIG. 7, and are not repeated herein. The number of information bits of the first group G12 of the DCI DCI1 may be determined (e.g., calculated) according to the number of PDSCHs (e.g., the PDSCHs PDSCH11, PDSCH21, PDSCH22) scheduled by the first group G12 of the DCI DCI1 in the slot(n), i.e., 3 (calculated by 1+1+1). The number of information bits of the second group G14 of the DCI DCI1 may be determined (e.g., calculated) according to the number of PDSCHs (e.g., PDSCHs PDSCH11, PDSCH42) scheduled by the second group G12 of the DCI DCI1 in the slot(n), i.e., 2 (calculated by 1+1).

Similarly, the communication device may determine the number of information bits of the third group G21 of the DCI DCI2 is equal to the number of information bits of the first group G12 of the DCI DCI1. The communication device may determine the number of information bits of the fourth group G34 of the DCI DCI3 is 2 (calculated by 1+1). The communication device may determine the number of information bits of the fifth group G41 of the DCI DCI4 is equal to the number of information bits of the second group G14 of the DCI DCI1. The communication device may determine the number of information bits of the sixth group G43 of the DCI DCI4 is equal to the number of information bits of the fourth group G34 of the DCI DCI3. Thus, the communication device may determine that the number of information bits for groups of potential DCIs DCI1-DCI4 for the slot(n) is a maximum value of 3, 2 and 2, which is 3. Then, the communication device may perform the HARQ transmission of the PDSCHs PDSCH11, PDSCH21, PDSCH22, PDSCH32 and PDSCH42 in the slot(n) by using 3 information bits.

Figure 9:
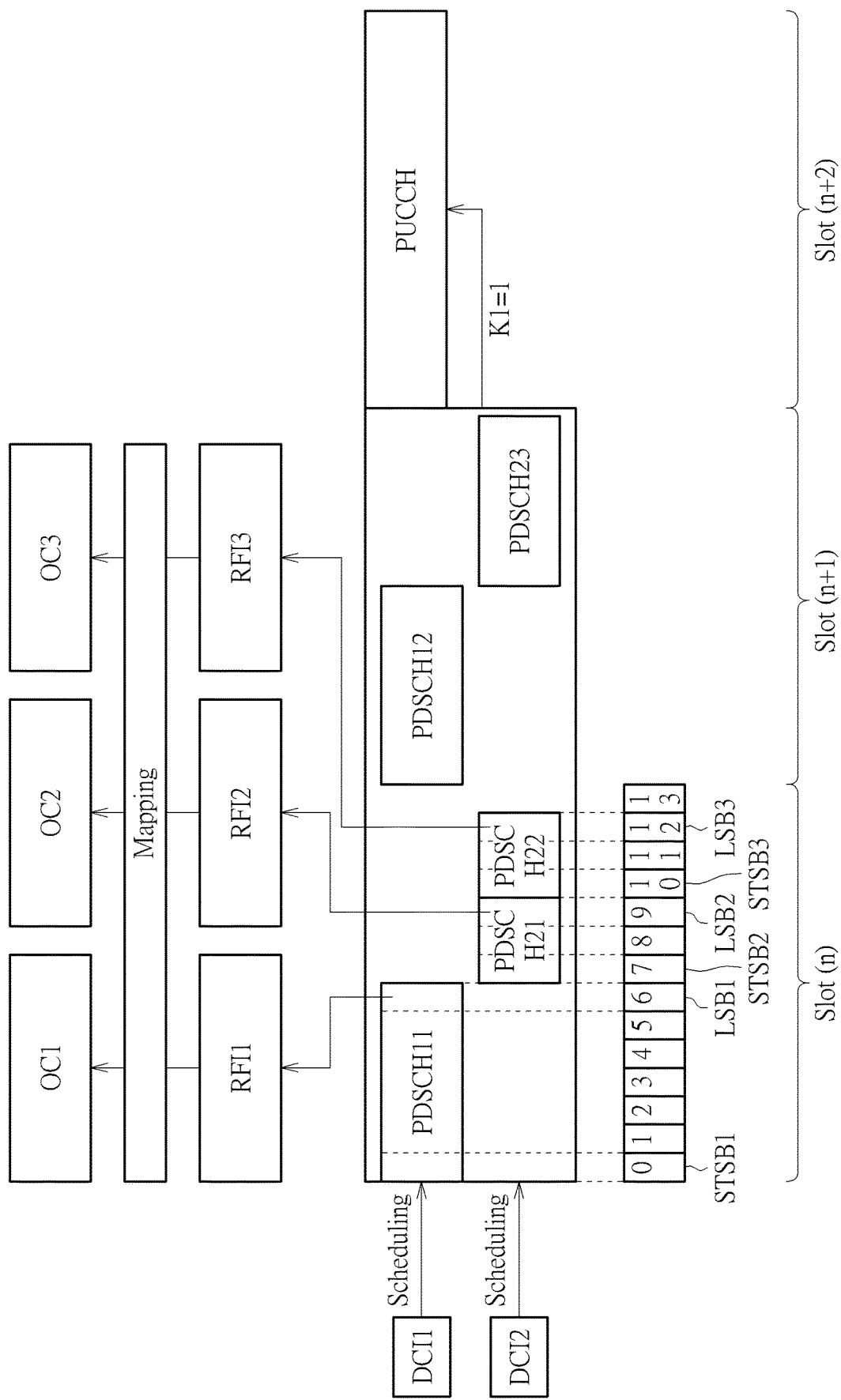
FIG. 9 is a schematic diagram of reference indexes according to an example of the present invention.

FIG. 9 is a schematic diagram of reference indexes according to an example of the present invention. Labels in FIG. 9 can be referred to the labels in FIG. 6, and are not repeated herein. There are start OFDM symbol indexes STSB1-STSB3 and the last OFDM symbol indexes LSB1-LSB3 corresponding to the PDSCHs PDSCH11, PDSCH21, PDSCH22, respectively. The communication device may determine reference indexes RFI1-RFI3 according to the last OFDM symbol indexes LSB1-LSB3, respectively. For example, the reference indexes RFI1-RFI3 are 6 or 20, 9 or 23 and 12 or 26 when the last OFDM symbol indexes LSB1-LSB3 are 6, 9 and 12, respectively. Then, the communication device may associate (e.g., map) the reference indexes RFI1-RFI3 to occasions OC1-OC3, respectively. The communication device may determine to place a bit of the HARQ transmission (e.g., "ACK") of the PDSCH PDSCH11 on the occasion OC1, wherein the start OFDM symbol index STSB1 of the PDSCH PDSCH11 (e.g., 0) is smaller than and most close to the reference index RFI1 (e.g., 6) and the reference index RFI1 is associated with the occasion OC1. The communication device may determine to place a bit of the HARQ transmission (e.g., "ACK") of the PDSCH PDSCH12 on the occasion OC2, wherein the start OFDM symbol index STSB2 of the PDSCH PDSCH21 (e.g., 7) is smaller than and most close to the reference index RFI2 (e.g., 9) and the reference index RFI2 is associated with the occasion OC2. The communication device may determine to place a bit of the HARQ transmission (e.g., "ACK") of the PDSCH PDSCH22 on the occasion OC3, wherein the start OFDM symbol index STSB3 of the PDSCH PDSCH22 (e.g., 10) is smaller than and most close to the reference index RFI3 (e.g., 12) and the reference index RFI3 is associated with the occasion OC3.

Figure 10:
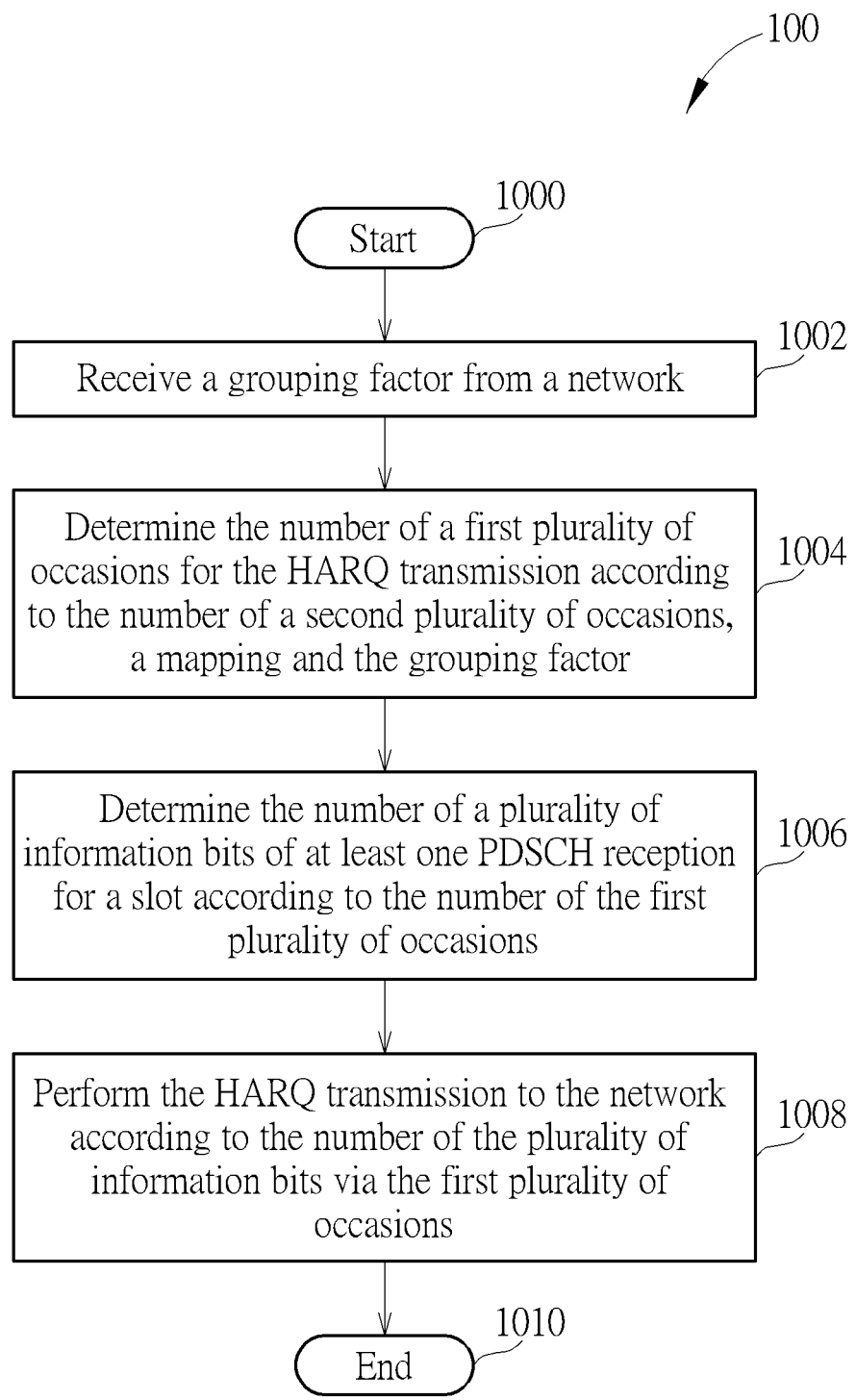
FIG. 10 is a flowchart of a process according to an example of the present invention.

FIG. 10 is a flowchart of a process 100 according to an example of the present invention. The process 100 may be utilized in a communication device (e.g., the communication device in FIG. 1), to handle a HARQ transmission. The process 100 may be compiled into the program codes 214 and includes the following steps:

Step 1000: Start.

Step 1002: Receive a grouping factor from a network (e.g., the network in FIG. 1).

Step 1004: Determine the number of a first plurality of occasions for the HARQ transmission according to the number of a second plurality of occasions, a mapping and the grouping factor.

Step 1006: Determine the number of a plurality of information bits of at least one PDSCH reception for a slot according to the number of the first plurality of occasions.

Step 1008: Perform the HARQ transmission to the network according to the number of the plurality of information bits via the first plurality of occasions.

Step 1010: End.

According to the process 100, the communication device may receive the grouping factor from the network. Then, the communication device may determine the number of the first occasions for the HARQ transmission according to the number of the second occasions, the mapping and the grouping factor. The communication device may determine the number of information bits of at least one PDSCH reception for the slot according to the number of the first occasions. The communication device may perform the HARQ transmission to the network according to the number of information bits via the first occasions. That is, the number of the second occasions, the mapping and the grouping factor are considered by the communication device to reduce the number of second occasions, so as to reduce the number of information bits of the at least one PDSCH reception for the slot. Thus, the problem of the redundant bits in the prior art can be improved.

Realization of the process 100 is not limited to the above description. The following examples may be applied for realizing the processes 30 and 100.

In one example, the communication device may receive the grouping factor from the network to determine the HARQ transmission. In one example, the grouping factor may be a positive integer. In one example, the grouping factor may be received in an RRC message, the DCI (e.g., the above DCI(s)) or another (e.g., dedicated) DCI or a MAC CE. In one example, the grouping factor may be predefined (e.g., in the 3GPP standard) or may be predetermined by the network. In one example, the grouping factor may be UE-specific. That is, the grouping factor is for a specific UE. In other words, another UE may not be indicated with the grouping factor.

In one example, a plurality of information bits of (e.g., all) the at least one PDSCH reception may be jointly operated (e.g., calculated by the communication) for the HARQ transmission, if the grouping factor is received. In one example, only one information bit (e.g., "ACK") may be needed for all the at least one PDSCH reception (scheduled by the single DCI), after the plurality of information bits of all the at least one PDSCH reception are jointly operated according to the grouping factor. In one example, the plurality of information bits of the at least one PDSCH reception is jointly operated for the HARQ transmission according to (e.g., by using) a AND operation (e.g., logic AND operation). In one example, the grouping factor may be used for the slot, i.e., other grouping factors may be used for other slots. In one example, the grouping factor may be used for the communication device, i.e., other grouping factors may be used for other communication devices.

In one example, the communication device may determine the number of the first occasions for the HARQ transmission according to the number of the second occasions, the mapping and the grouping factor, when (e.g., after) performing a prune procedure. The prune procedure may be performed by grouping overlapped PDSCHs in the slot.

In one example, the communication device may receive a threshold value from the network, e.g., via an RRC message, a DCI (e.g., the above DCIs or a dedicated DCI) or a MAC CE. The communication device may determine the number of the first occasions for the HARQ transmission according to the number of the second occasions, the mapping and the grouping factor, when the number of information bits of the at least one PDSCH reception for the slot generated according to the prune procedure (i.e., the number of bits of the first occasions) is greater than the threshold value. In one example, the threshold value may be determined according to the capability of the communication device. In one example, the grouping factor may be determined according to the number of bits of the second occasions and the threshold value. For example, the grouping factor is determined via a ceil function, e.g., the least integer greater than or equal to the number of bits of the second occasions dividing the threshold value.

In one example, the mapping may be performed according to the ceil function. That is, the communication device may map the second occasions to the first occasions according to the ceil function. For example, the number of the first occasions is determined as the least integer greater than or equal to the number of the second occasions dividing the grouping factor. Then, the communication device may determine the number of information bits of the at least one PDSCH reception for the slot according to the number of the first occasions.

In one example, the mapping may be a bundle operation. That is, the communication device may map the second occasions to the first occasions according to the bundle operation. In one example, the bundle operation may be realized according to a floor function. For example, indexes of the first occasions are determined as the largest integer less than or equal to indexes of the second occasions dividing the grouping factor, respectively. Then, the communication device may determine the number of information bits of the at least one PDSCH reception for the slot according to the number of the indexes of the first occasions. In one example, the bundle operation may be realized according to a AND operation (e.g., logic AND operation).

In one example, the mapping may be a one-to-one mapping, when the grouping factor is equal to 1. In one example, the mapping may be a many-to-one mapping, when the grouping factor is greater than 1.

Figure 11:
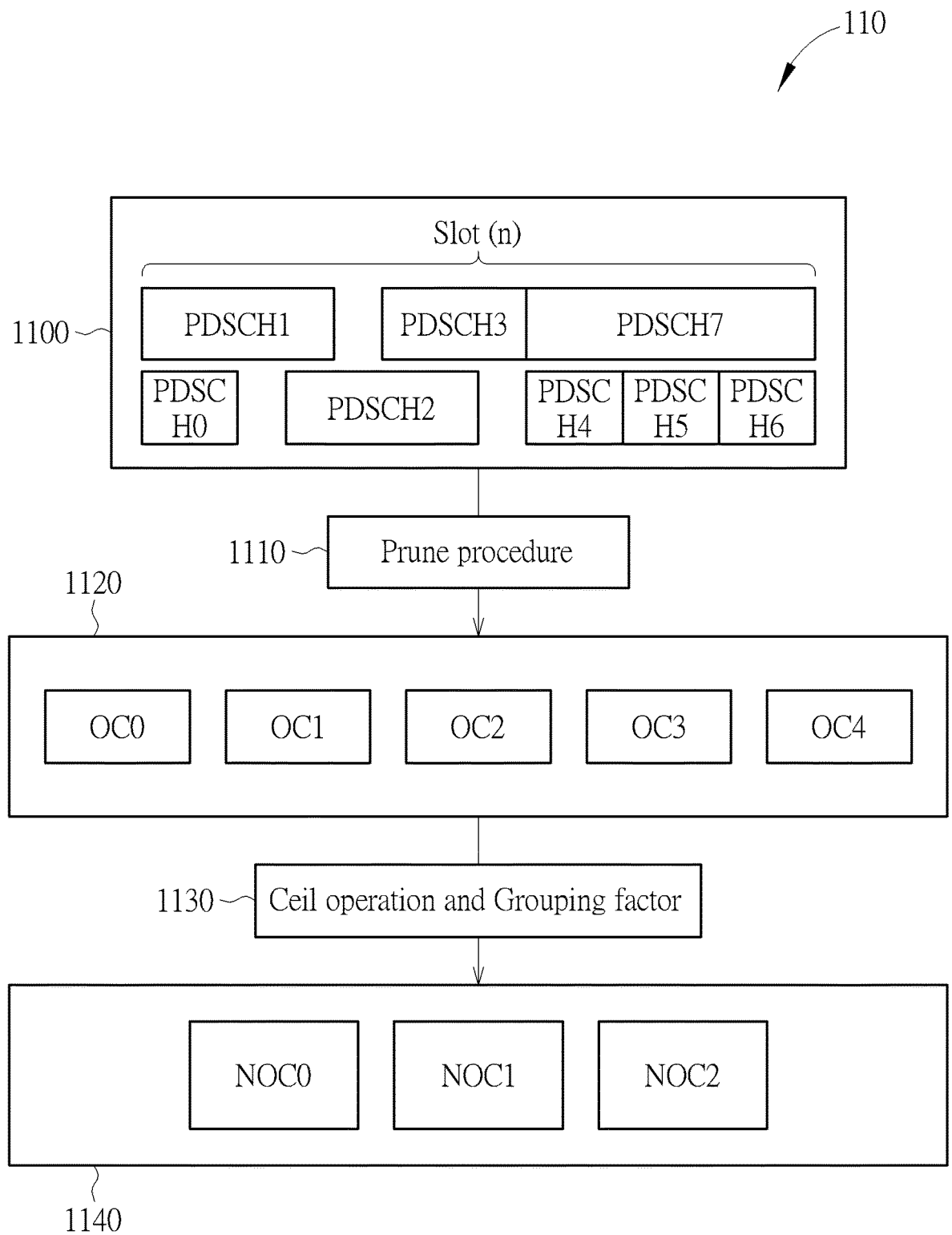
FIG. 11 is a schematic diagram of the number of information bits of at least one PDSCH reception according to a mapping after a prune procedure according to an example of the present invention.

FIG. 11 is a schematic diagram of the number of information bits of at least one PDSCH reception according to a mapping after a prune procedure 110 according to an example of the present invention. There are PDSCHs PDSCH0-PDSCH7, occasions OC0-OC4 and new occasions NOC0-NOC2 in the present example. In step 1100, the PDSCHs PDSCH0-PDSCH7 may be scheduled to be received in a slot (n), where n is a non-negative integer. In step 1110, the communication device may perform the prune procedure on the PDSCHs PDSCH0-PDSCH7 in the slot (n). In step 1120, the communication device may obtain the occasions OC0-OC4 when (e.g., after) performing the prune procedure. The prune procedure may be performed by grouping the PDSCHs PDSCH0 and PDSCH1 which are overlapped, grouping the PDSCHs PDSCH2 and PDSCH3 which are overlapped, grouping the PDSCHs PDSCH4 and PDSCH7 which are overlapped, grouping the PDSCHs PDSCH5 itself and grouping the PDSCHs PDSCH6 itself. In step 1130, the communication device may apply a ceil function and a grouping factor (e.g., 2) on the occasions OC0-OC4. In step 1140, the communication device may obtain the new occasions NOC0-NOC2 when (e.g., after) applying the ceil function and the grouping factor on the occasions OC0-OC4. For example, the number of the new occasions NOC0-NOC2 is calculated by the least integer greater than or equal to the number of the occasions OC-OC3 (e.g., 5) dividing the grouping factor (e.g., 2), i.e., $$\operatorname{ceil}\left(\frac{5}{2}\right) = 3.$$

Then, the communication device may determine 3 information bits (e.g., "ACK" or "NACK") of the PDSCHs PDSCH0-PDSCH7, and may perform the HARQ transmission of the PDSCHs PDSCH0-PDSCH7 by using the 3 information bits via the new occasions NOC0-NOC2.

Figure 12:
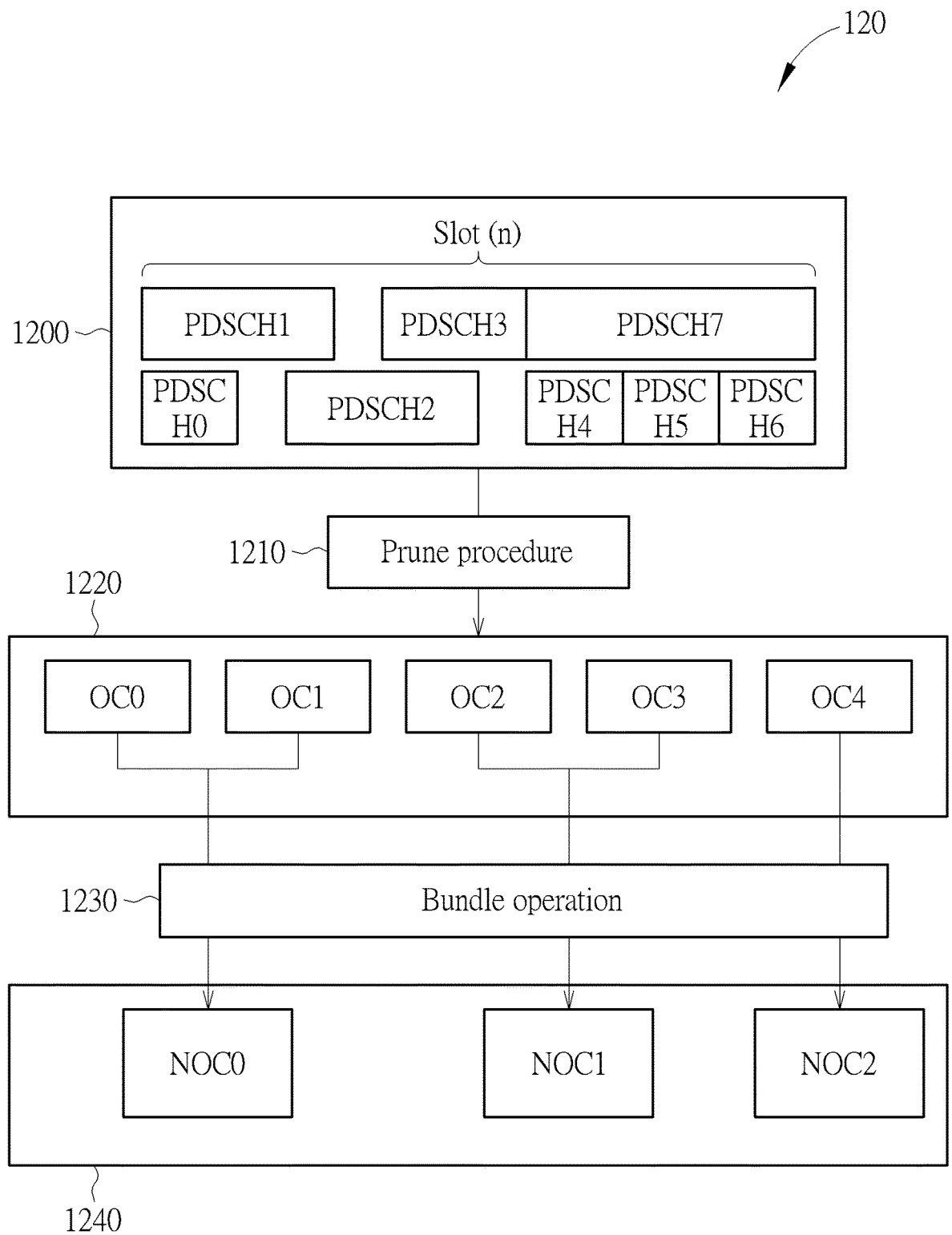
FIG. 12 is a schematic diagram of the number of information bits of at least one PDSCH reception according to a mapping after a prune procedure according to an example of the present invention.

FIG. 12 is a schematic diagram of the number of information bits of at least one PDSCH reception according to a mapping after a prune procedure 120 according to an example of the present invention. Labels in FIG. 12 can be referred to the labels in FIG. 11, and are not repeated herein. The steps 1200-1220 are Similar to the steps 1100-1120 in FIG. 11. In step 1230, the communication device may apply a bundle operation and a grouping factor (e.g., 2) on the occasions OC0-OC4. In step 1240, the communication device may obtain the new occasions NOC0-NOC2 when (e.g., after) applying the bundle operation and the grouping factor on the occasions OC0-OC4. For example, indexes of the new occasions NOC0-NOC2 (e.g., k, where k=0, 1, 2) are calculated by the largest integer less than or equal to indexes of the occasions OC0-OC5 (e.g., j, where j=0, 1, 2, 3, 4) dividing the grouping factor (e.g., g, where g=2), e.g., $$\mathrm{floor}\left(\frac{j}{g}\right) = k.$$

Then, the communication device may determine 3 information bits for new occasions NOC0-NOC2, and may perform the HARQ transmission of the PDSCHs PDSCH0-PDSCH7 by using the 3 information bits via the new occasions NOC0-NOC2.

Figure 13:
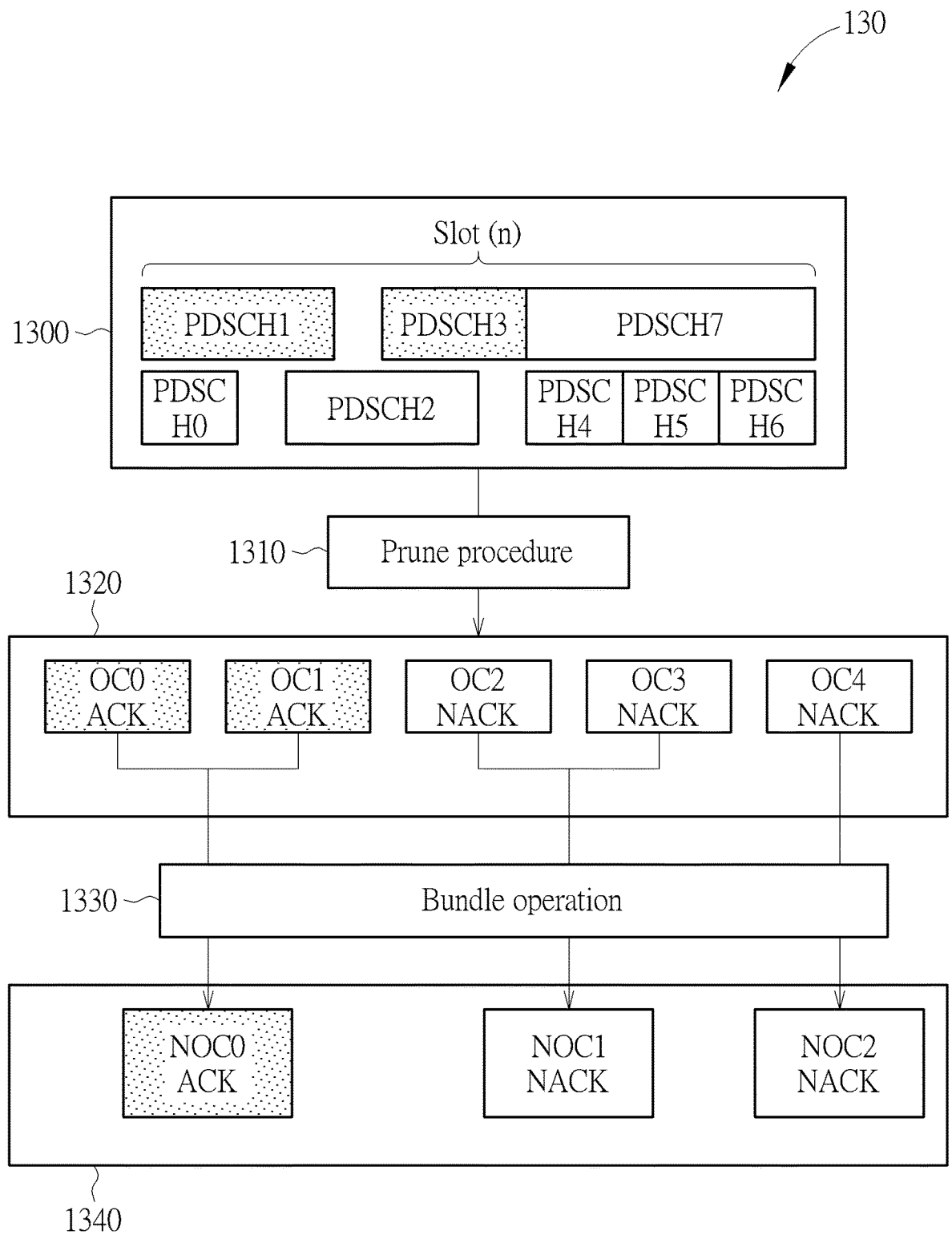
FIG. 13 is a schematic diagram of the number of information bits of at least one PDSCH reception according to a mapping after a prune procedure according to an example of the present invention.

FIG. 13 is a schematic diagram of the number of information bits of at least one PDSCH reception according to a mapping after a prune procedure 130 according to an example of the present invention. Labels and steps 1300-1340 in FIG. 13 can be referred to the labels and steps 1100-1140 in FIG. 11, and are not repeated herein. In another example of FIG. 11, receptions of the PDSCHs PDSCH1 and PDSCH3 are scheduled by a single DCI (illustrated as dotted pattern) and receptions of the PDSCHs PDSCH0, PDSCH2, PDSCH4-PDSCH7 are not scheduled. Since the PDSCHs PDSCH1 and PDSCH3 are pruned to the occasions OC0 and OC1, respectively, and the occasions OC0 and OC1 are bundled to the new occasions NOC0, the communication device may determine 1 information bit for new occasions NOC0, and may perform the HARQ transmission (e.g., transmit an "ACK") of the PDSCHs PDSCH1 and PDSCH3 by using the 1 information bits via the new occasions NOC0. That is, only one information bit (e.g., "ACK") is needed for all the PDSCHs PDSCH1 and PDSCH3 (scheduled by the single DCI), after the plurality of information bits of all the PDSCHs PDSCH1 and PDSCH3 are jointly operated (e.g., calculated by the communication device) according to the grouping factor. Since the PDSCHs PDSCH4 and PDSCH7 are pruned to the occasions OC2 and the PDSCHs PDSCH5 is pruned to the occasions OC3, and the occasions OC2 and OC3 are bundled to the new occasions NOC1, the communication device may determine 1 information bit for the new occasions NOC1, and may perform HARQ transmission (e.g., transmit a "NACK") of the PDSCHs PDSCH4, PDSCH5 and PDSCH7 by using the 1 information bit via the new occasions NOC1. Since the PDSCHs PDSCH6 are pruned to the occasions OC4, and the occasions OC4 is bundled to the new occasions NOC2, the communication device may determine 1 information bit for the new occasions NOC2, and may perform HARQ transmission (e.g., transmit a "NACK") of the PDSCHs PDSCH6 by using the 1 information bit via the new occasions NOC2.

The above examples may be applied for realizing the processes 30 and 100.

In the above examples, the network may be replaced by a cell, a serving cell, a transmission reception point (TRP), an unlicensed cell, an unlicensed serving cell, an unlicensed TRP, a gNB, an eNB, but is not limited herein.

The operation of "determine" described above may be replaced by the operation of "compute", "calculate", "obtain", "generate", "output, "use", "choose/select" or "decide". The term of "according to" described above may be replaced by "in response to". The phrase of "associated with" described above may be replaced by "of" or "corresponding to". The term of "via" described above may be replaced by "on", "in" or "at".

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

Examples of the hardware may include analog circuit(s), digital circuit(s) and/or mixed circuit(s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 20.

To sum up, the present invention provides a communication device and method for handling a HARQ transmission. Operations for the communication device to reduce the redundant bits when performing the HARQ transmission are recited. Thus, the problem of the redundant bits in the prior art is improved, and performance of HARQ transmission performed by the communication device is improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a hybrid automatic repeat request (HARQ) transmission, comprising:
at least one storage device; and
at least one processing circuit, coupled to the at least one storage device, wherein the at least one storage device stores instructions, and the at least one processing circuit is configured to execute the instructions of:

receiving a configuration from a network, wherein the configuration comprises a time domain resource allocation (TDRA) table and a set of a plurality of timing values, wherein the TDRA table has a row that comprises a plurality of entries, wherein each of the plurality of entries has a start and length indicator value (SLIV), a mapping type and a scheduling offset; and receiving a downlink (DL) control information (DCI) from the network, wherein the DCI indicates the row of the TDRA table for a plurality of physical DL shared channel (PDSCH) receptions and indicates a timing value of the set of the plurality of timing values for the HARQ transmission corresponding to the plurality of PDSCH receptions.

2. The communication device of claim 1, wherein the plurality of PDSCH receptions does not overlap with an uplink (UL) symbol.

3. The communication device of claim 1, further comprising:

receiving a grouping factor from the network to determine the HARQ transmission.

4. The communication device of claim 3, wherein the grouping factor is received via a radio resource control (RRC) message, the DCI or a media access control control element (MAC CE).

5. The communication device of claim 3, wherein the grouping factor is predefined.

6. The communication device of claim 3, wherein the grouping factor is user equipment (UE)-specific.

7. The communication device of claim 3, wherein a plurality of information bits of the plurality of PDSCH receptions are jointly operated for the HARQ transmission, if the grouping factor is received.

8. The communication device of claim 7, wherein the plurality of information bits of the plurality of PDSCH receptions are jointly operated for the HARQ transmission according to a AND operation.

9. The communication device of claim 1, wherein the timing value of the set of the plurality of timing values is applied to a slot for the last PDSCH reception of the plurality of PDSCH receptions scheduled by the DCI.

10. A method of handling a hybrid automatic repeat request (HARQ) transmission, comprising:

receiving a configuration from a network, wherein the configuration comprises a time domain resource allocation (TDRA) table and a set of a plurality of timing values, wherein the TDRA table has a row that comprises a plurality of entries, wherein each of the plurality of entries has a start and length indicator value (SLIV), a mapping type and a scheduling offset; and receiving a downlink (DL) control information (DCI) from the network, wherein the DCI indicates the row of the TDRA table for a plurality of physical DL shared channel (PDSCH) receptions and indicates a timing value of the set of the plurality of timing values for the HARQ transmission corresponding to the plurality of PDSCH receptions.

* * * * *